(12) United States Patent
Deng et al.

(10) Patent No.: US 11,851,020 B1
(45) Date of Patent: Dec. 26, 2023

(54) SELECTIVELY EXTENDABLE SEAT AIRBAG (71) Applicant: Ford Global Technologies, LLC, Dearborn, MI (US)

(72) Inventors: Zhibing Deng, Northville, MI (US); Joseph E. Abramczyk, Farmington Hills, MI (US); Deepak Patel, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 18/065,686

(22) Filed: Dec. 14, 2022

(51) Int. Cl.
*B60R 21/207* (2006.01)
*B60R 21/231* (2011.01)
*B60R 21/2338* (2011.01)

(52) U.S. Cl.
CPC ........ *B60R 21/207* (2013.01); *B60R 21/2338* (2013.01); *B60R 21/23138* (2013.01); *B60R 2021/23146* (2013.01); *B60R 2021/23384* (2013.01)

(58) Field of Classification Search
CPC ............ B60R 21/207; B60R 21/23138; B60R 2021/23146; B60R 21/2338; B60R 2021/23384
See application file for complete search history.

(56) References Cited

U.S. PATENT DOCUMENTS

| | | | |
|---|---|---|---|
| 9,469,268 B2 * | 10/2016 | Sugimoto | B60R 21/237 |
| 9,682,681 B1 | 6/2017 | Patel et al. | |
| 10,486,638 B2 * | 11/2019 | Kwon | B60R 21/2338 |
| 10,821,928 B2 | 11/2020 | Deng et al. | |
| 11,059,442 B2 | 7/2021 | Adler | |
| 11,091,111 B2 | 8/2021 | Deng et al. | |
| 11,091,114 B2 * | 8/2021 | Komura | B60R 21/23138 |
| 11,148,628 B1 * | 10/2021 | Thomas | B60R 21/01532 |
| 11,161,473 B2 * | 11/2021 | Deng | B60R 21/233 |
| 11,267,427 B1 * | 3/2022 | Deng | B60R 21/207 |
| 11,292,419 B2 * | 4/2022 | Wiik | B60R 21/23138 |
| 11,407,376 B2 * | 8/2022 | Moon | B60R 21/2338 |
| 11,505,158 B2 * | 11/2022 | Choi | B60R 21/23138 |
| 11,634,098 B1 * | 4/2023 | Line | B60R 21/0136 280/730.2 |
| 2020/0317155 A1 | 10/2020 | Deng et al. | |
| 2021/0170978 A1 * | 6/2021 | Acker | B60R 21/23138 |
| 2021/0197749 A1 * | 7/2021 | Wiik | B60R 21/207 |

(Continued)

FOREIGN PATENT DOCUMENTS

CN 101570172 B 3/2013

*Primary Examiner* — Faye M Fleming
(74) *Attorney, Agent, or Firm* — Frank A. MacKenzie; Bejin Bieneman PLC (57) ABSTRACT

An assembly including a vehicle seat. The assembly includes an airbag supported by the vehicle seat and inflatable to an inflated position. The airbag includes a main chamber elongated along an axis and an extension supported by the main chamber. The extension extends from the main chamber transverse to the axis in the inflated position. The main chamber includes a lower segment and an upper segment selectively extendable away from the lower segment along the axis from an unreleased position to a released position. The extension is supported by the upper segment of the main chamber and the extension is translatable along the axis with the main chamber from the unreleased position to the released position.

20 Claims, 9 Drawing Sheets

(56) References Cited

U.S. PATENT DOCUMENTS

| | | |
|---|---|---|
| 2021/0268987 A1 | 9/2021 | Choi et al. |
| 2023/0128759 A1* | 4/2023 | Deng ................. B60R 21/2338 280/743.2 |

* cited by examiner

SELECTIVELY EXTENDABLE SEAT AIRBAG

BACKGROUND

A side airbag is mounted to a seatback and is inflatable along a side of an occupant, specifically along the torso and/or hip of the occupant. The side airbag, for example, may be inflatable between the occupant and a vehicle door. The side airbag controls the kinematics of the occupant in certain vehicle impacts that urge the occupant in a cross-vehicle direction, e.g., a certain side impact.

DETAILED DESCRIPTION

An assembly including a vehicle seat. The assembly includes an airbag supported by the vehicle seat and inflatable to an inflated position. The airbag includes a main chamber elongated along an axis and an extension supported by the main chamber. The extension extends from the main chamber transverse to the axis in the inflated position. The main chamber includes a lower segment and an upper segment selectively extendable away from the lower segment along the axis from an unreleased position to a released position. The extension is supported by the upper segment of the main chamber and the extension is translatable along the axis with the main chamber from the unreleased position to the released position.

The upper segment may include a releasable portion elongated along the axis, the releasable portion being releasable from the unreleased position to the released position.

The assembly may include a stitch extending through the releasable portion. The stitch may be frangible relative to the airbag.

The assembly may include a releasable tether selectively releasably connected to the releasable portion. The main chamber may be in the unreleased position when the releasable tether in an unreleased position and the main chamber may be in the released position when the releasable tether is in a released position.

The upper segment may include a vehicle-inboard panel and a vehicle-outboard panel, the vehicle-inboard panel and the vehicle-outboard panel including the releasable portion.

The extension may be supported by the vehicle-outboard panel.

The upper segment may overlap itself at the releasable portion in the unreleased position.

The assembly may include a computer including a processor and a memory storing instructions executable by the processor to identify a size of an occupant seated in the vehicle seat and release the releasable portion based on the identification of the size of the occupant.

The assembly may include a releasable tether selectively releasably connected to the main chamber. The main chamber may be in the unreleased position when the releasable tether in an unreleased position and the main chamber may be in the released position when the releasable tether is in a released position.

The assembly may include a tether release coupled to the releasable tether.

The assembly may include a computer including a processor and a memory storing instructions executable by the processor to identify a size of an occupant seated in the vehicle seat and activate the tether release based on the identification of the size of the occupant.

The assembly may include a computer including a processor and a memory storing instructions executable by the processor to identify a size of an occupant seated in the vehicle seat and release the upper segment based on identification of the size of the occupant.

The main chamber may be elongated a first distance in the unreleased position and a second distance in the released position. The second distance may be longer than the first distance.

The airbag may be vehicle-inboard of the vehicle seat in the inflated position.

The assembly may include a console adjacent the vehicle seat. The airbag may be inflatable between the console and the vehicle seat.

The assembly may include vehicle seat defining an occupant seating area. The extension may be between the main chamber and the occupant seating area.

The airbag may be vehicle-inboard of the occupant seating area.

The vehicle seat may include a seatback elongated along the axis. The airbag may be supported by the seatback.

The upper segment may be extendable along the seatback.

The extension may be translatable relative to the seatback.

With reference to the Figures, wherein like numerals indicate like parts throughout the several views, an assembly 10 for a vehicle 12 includes a vehicle seat 14. The assembly 10 includes an airbag 16 supported by the vehicle seat 14 and inflatable to an inflated position. The airbag 16 includes a main chamber 18 elongated along an axis A and an extension 20 supported by the main chamber 18. The extension 20 extends from the main chamber 18 transverse to the axis A in the inflated position. The main chamber 18 includes a lower segment 22 and an upper segment 24 selectively extendable away from the lower segment 22 along the axis A from an unreleased position to a released position. The extension 20 is supported by the upper segment 24 of the main chamber 18 and the extension 20 is translatable along the axis A with the main chamber 18 from the unreleased position to the released position.

In the event of certain impacts to the vehicle 12, for example, certain far-side impacts, the airbag 16 inflates to the inflated position. The airbag 16 may control the kinematics of an occupant in the event of the certain impacts. The extension 20 may control the kinematics of the head of the occupant and may be translatable along the axis A to control the kinematics of the head. Based on the size of an occupant, the main chamber 18 may selectively extend to increase the distance of the extension 20 from a bottom of the main chamber 18. In the event of a larger occupant, for example a taller occupant, the main chamber 18 moves to the released position based on determining the occupant is a larger occupant. In the event of a smaller occupant, for example, a shorter occupant, the main chamber 18 remains in the unreleased position based on determining the occupant is a smaller occupant. In other words, the location of the extension 20 along the axis A depends on the size of the occupant of the seat 14. Because the main chamber 18 is selectively extendable, the extension 20 may control the kinematics of occupants of multiple sizes that may be seated in the seat 14.

Figure 1:
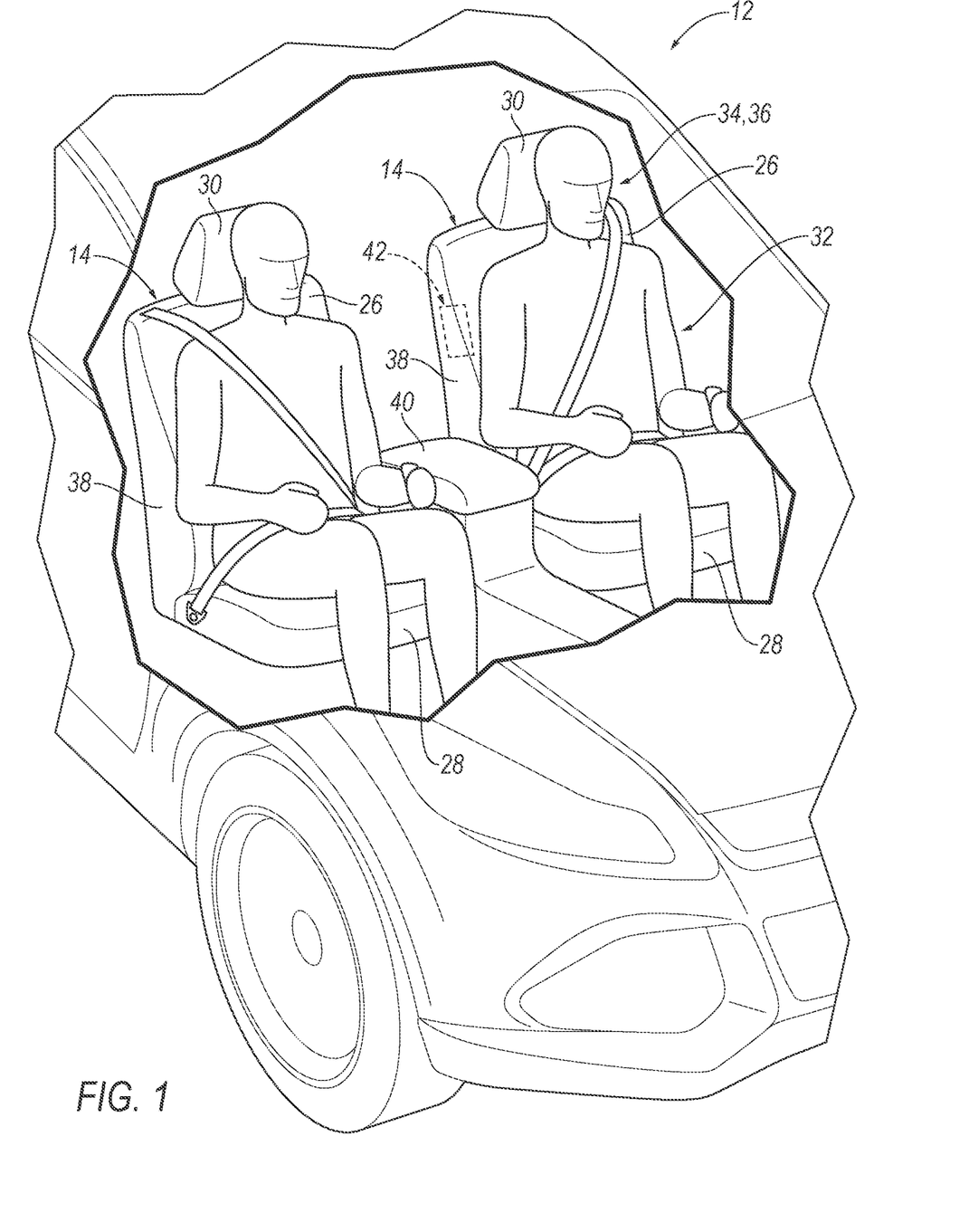
FIG. 1 is a perspective view of a vehicle having a plurality of seats.
Figure 2:
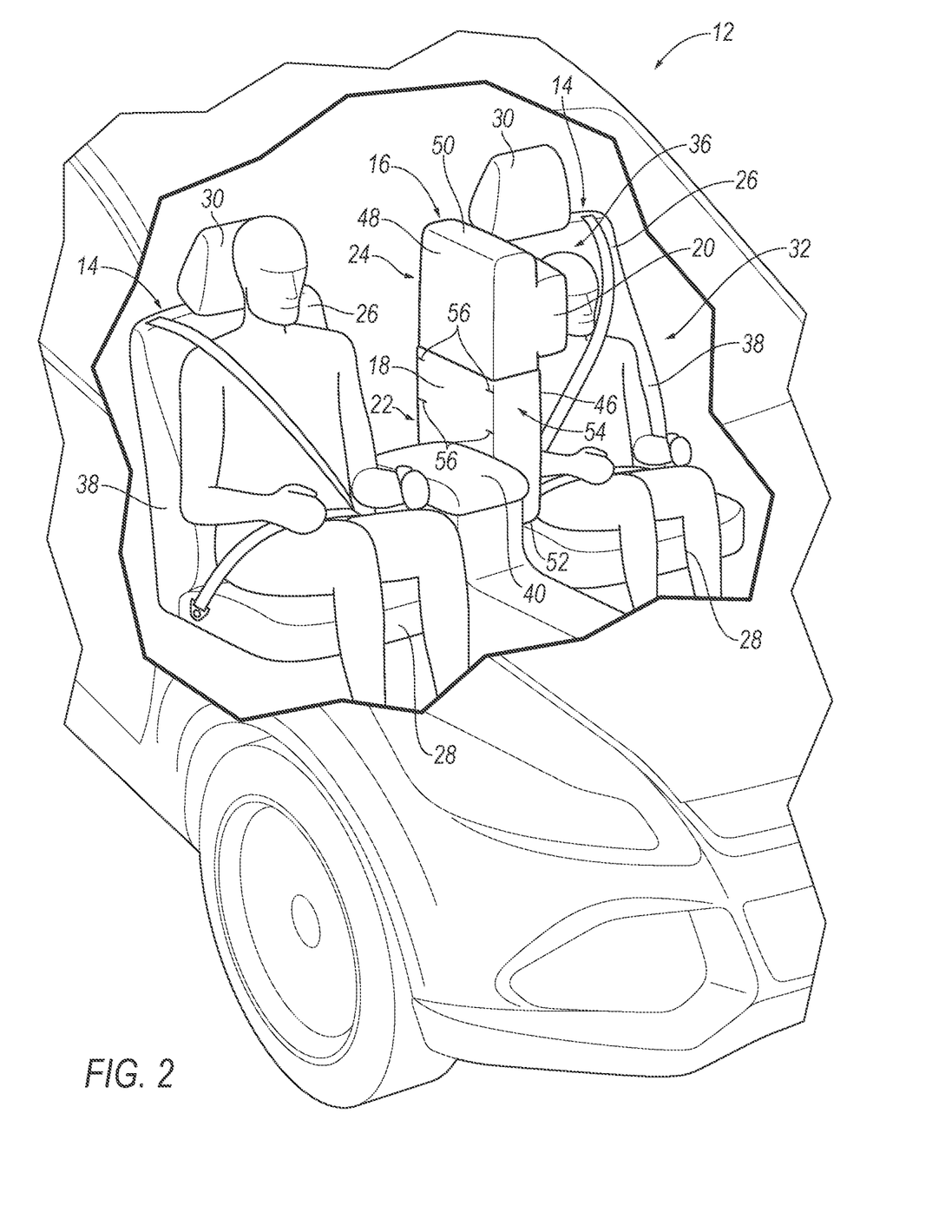
FIG. 2 is a perspective view of the vehicle with an airbag inflated to an inflated position adjacent the seats and a main chamber of the airbag in an unreleased position.
Figure 3:
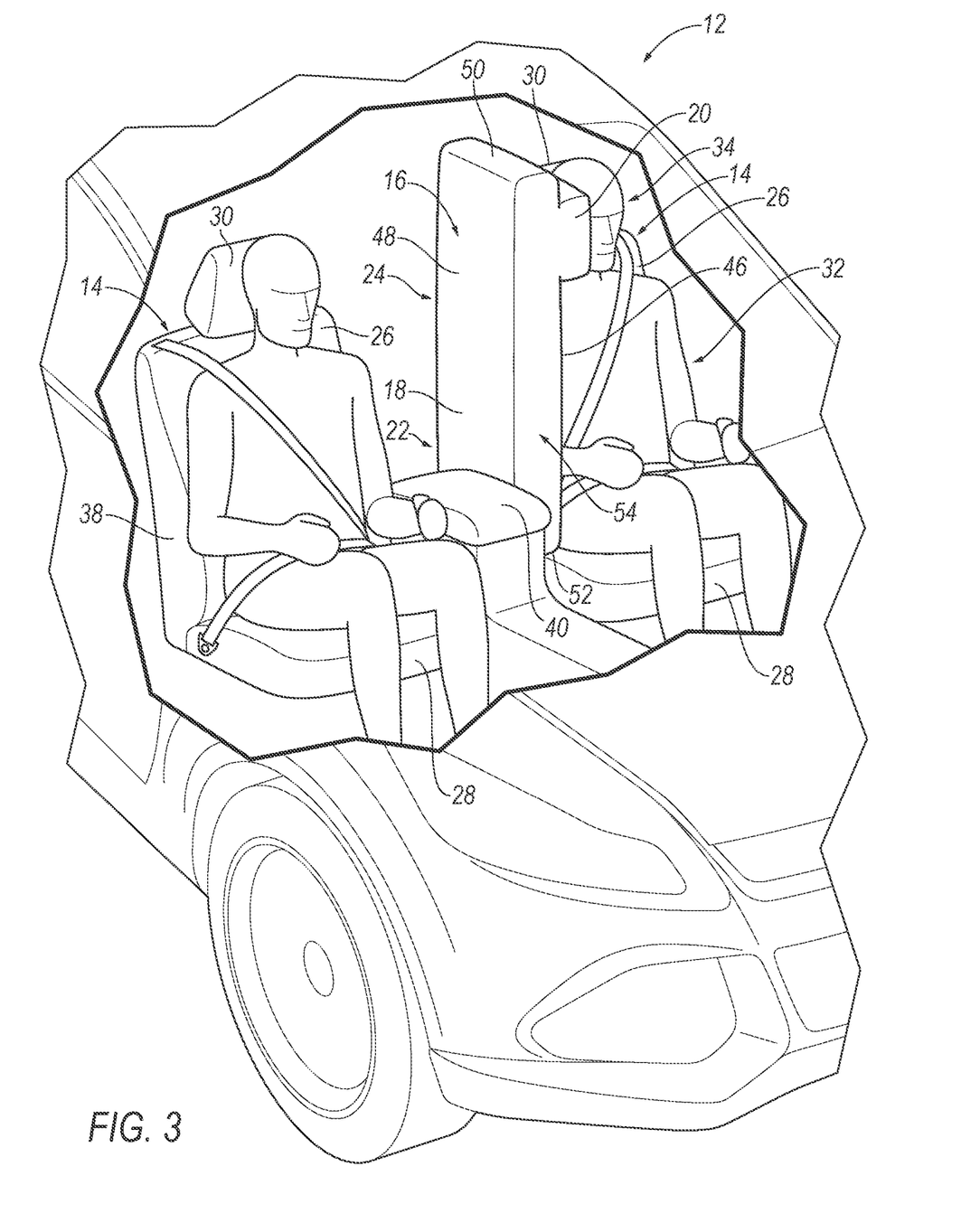
FIG. 3 is a perspective view of the vehicle with the airbag inflated to the inflated position adjacent the seats and the main chamber of the airbag in a released position.

With reference to FIGS. 1-3, the vehicle 12 may be any suitable type of ground vehicle, e.g., a passenger or commercial automobile such as a sedan, a coupe, a truck, a sport utility, a crossover, a van, a minivan, a taxi, a bus, etc. The vehicle 12 includes a vehicle 12 body (not numbered) including rockers, roof rails, pillars, body panels, etc.

The vehicle 12 includes a passenger compartment (not numbered) to house occupants, if any, of the vehicle 12. The passenger compartment may extend across the vehicle 12, i.e., from one side to the other side of the vehicle 12. The passenger compartment includes a front end and a rear end with the front end being in front of the rear end during forward movement of the vehicle 12.

The vehicle 12 may include one or more seats 14. Specifically, the vehicle 12 may include any suitable number of seats 14. The seats 14 are supported by a vehicle floor (not numbered). The seats 14 may be arranged in any suitable arrangement in the passenger compartment. As in the example shown in the Figures, one or more of the seats 14 may be at the front end of the passenger compartment, e.g., a driver seat and/or a passenger seat. In other examples, one or more of the seats 14 may be behind the front end of the passenger compartment, e.g., at the rear end of the passenger compartment. The seats 14 may be movable relative to the vehicle floor to various positions, e.g., movable fore-and-aft and/or cross-vehicle. The seat 14 may be of any suitable type, e.g., a bucket seat.

The seats 14 include a seatback 26, a seat bottom 28, and a head restraint 30. The seatback 26 is elongated along the axis A. The head restraint 30 may be supported by and extending upwardly from the seatback 26. The head restraint 30 may be stationary or movable relative to the seatback 26. The seatback 26 may be supported by the seat bottom 28 and may be stationary or movable relative to the seat bottom 28. The seatback 26, the seat bottom 28, and the head restraint 30 may be adjustable in multiple degrees of freedom. Specifically, the seatback 26, the seat bottom 28, and the head restraint 30 may themselves be adjustable. In other words, adjustable components within the seatback 26, the seat bottom 28, and the head restraint 30 may be adjustable relative to each other.

The seatback 26 includes a seat frame (not shown) and a covering (not numbered) supported on the seat frame. The seat frame may include tubes, beams, etc. Specifically, the seat frame includes a pair of upright frame members. The upright frame members are elongated, and specifically, are elongated in a generally upright direction when the seatback 26 is in a generally upright position. The upright frame members are spaced from each other and the seat frame includes one or more cross-members extending between the upright frame members. The seat frame, including the upright frame members, may be of any suitable plastic material, e.g., carbon fiber reinforced plastic (CFRP), glass fiber-reinforced semi-finished thermoplastic composite (organosheet), etc. As another example, some or all components of the seat frame may be formed of a suitable metal, e.g., steel, aluminum, etc.

The covering may include upholstery, padding, and/or plastic portions. The upholstery may be cloth, leather, faux leather, or any other suitable material. The upholstery may be stitched in panels around the seat frame. The padding may be between the covering and the seat frame and may be foam or any other suitable material.

With continued reference to FIGS. 1-3, the seatback 26 and the seat bottom 28 of each of the seats 14 define an occupant seating area 32 of the seats 14. The occupant seating area 32 is the area occupied by an occupant when properly seated on the seat bottom 28 and the seatback 26. The occupant seating area 32 is in a seat-forward direction of the seatback 26 and above the seat bottom 28. In the example shown in the Figures, the occupant seating area 32 faces the front end of the passenger compartment when the seat 14 is in the forward-facing position and the occupant seating area 32 faces the rear end of the passenger compartment when the seat 14 is in the rearward-facing position.

Each of the seats 14 defines one or more occupant head areas 34, 36. The locations of the occupant head areas 34, 36 may depend on the size of an occupant seated in the seat 14. For example, the seat 14 shown in the Figures defines a first occupant head area 34 for a taller occupant and a second occupant head area 36 for a shorter occupant. The occupant head areas 34, 36 are vehicle-forward of the head restraint 30 of the seats 14. The occupant head areas 34, 36 are the volumes typically occupied by the head of an occupant of multiple sizes properly seated in the seats 14 of the vehicle 12. The occupant seating area 32 may include the first occupant head area 34 for some occupants while the occupant seating area 32 may include the second occupant head area 36 for other occupants. The occupant head areas 34, 36 may vary based on the sized of different occupants that may be seated in the seat 14 at any given time.

The seatback 26 of the seat 14 may include a pair of bolsters 38 on opposite sides of the occupant seating area 32, i.e., the occupant seating area 32 is between the bolsters 38. The bolsters 38 are spaced cross-seat from each other. The bolsters 38 are elongated, and specifically, are elongated in a generally upright direction when the seatback 26 is in a generally upright position. The bolsters 38 define cross-seat boundaries of the seatback 26, i.e., the seatback 26 terminates at the bolsters 38. The bolsters 38 may extend in a seat-forward direction relative to the occupant seating area 32, i.e., on opposite sides of the torso and shoulders of an occupant seated on the seat 14. The extension 20 of the bolsters 38 relative to the occupant seating area 32 may be defined by the upright frame members and/or the covering. In the example shown in the Figures, the size and shape of both the upright frame members and the covering form the bolsters 38.

With reference to FIGS. 1-3 and FIGS. 5A-6B, the vehicle 12 includes a middle console 40 between the seats 14 of the vehicle 12. Specifically, the middle console 40 may be supported by the vehicle floor between the seats 14. The seats 14 may each be adjacent the middle console 40 and vehicle-outboard of the middle console 40. The seats 14 are spaced from each other by the middle console 40. The middle console 40 is adjacent each of the seats 14.

The middle console 40 includes a fixed portion (not numbered) that is fixed relative to the passenger compartment. The middle console 40, specifically the fixed portion, may have sides (not numbered) that face laterally, i.e., face in the cross-vehicle direction. The sides are adjacent the seats 14 and the seats 14 may be spaced from or may abut the sides. The fixed portion may have a forward side and a rearward side each extending in the cross-vehicle direction from one side to the other side. Specifically, the forward side is spaced vehicle-forward from the rearward side. The forward side faces vehicle-forward and the rearward side faces vehicle-rearward. The middle console 40 may be formed of a rigid material, e.g., plastic.

The assembly 10 includes include an airbag assembly 42. The airbag assembly 42 includes the airbag 16, an inflator 44, and may include a housing (not shown). The airbag assembly 42, e.g., the airbag 16, is supported by the seat 14. Specifically, the airbag 16 is supported by the seatback 26 of the seat 14. The airbag 16 may be supported by the seat frame of the seatback 26 of the seat 14. The airbag 16 is supported by a vehicle-inboard side of the seat frame. The airbag 16 is inflatable from an uninflated position to the inflated position between the seat 14 and a second seat 14 of the vehicle 12. In other words, the airbag 16 is between the seats 14 when the airbag 16 is in the inflated position. The seats 14 are vehicle-outboard of the airbag 16 in the inflated position. In other words, the airbag 16 is vehicle-inboard of the seat 14 in the inflated position. The airbag 16 is vehicle-inboard of the occupant seating area 32 in the inflated position. In other words, the occupant seating area 32 is vehicle-outboard of the airbag 16 when the airbag 16 is in the inflated position. The airbag 16 may be inflatable to the inflated position between the middle console 40 and the seat 14.

With continued reference to FIGS. 1-6B, the airbag 16 includes a plurality of chambers 18, 20. Specifically, the airbag 16 includes the main chamber 18 and the extension 20. As discussed above, the airbag 16 is between the seats 14 in the inflated position. Specifically, the main chamber 18 and the extension 20 are between the seats 14. The airbag 16 controls the kinematics of occupants seated in the seats 14 in the event of certain impacts to the vehicle 12.

The main chamber 18 is elongated along the axis A. The main chamber 18 is elongated along the seatback 26 in the inflated position. The main chamber 18 is vehicle-inboard of the seat 14 in the inflated position. In other words, the main chamber 18 is vehicle-inboard of the occupant seating area 32 and the occupant head areas 34, 36. The main chamber 18 may include a vehicle-inboard panel 48 spaced from the seat 14 and a vehicle-outboard panel 46 between the vehicle-inboard panel 48 and the occupant seating area 32 of the seat 14. The vehicle-outboard panel 46 may face toward the occupant seating area 32 and the vehicle-inboard panel 48 may face and abut the middle console 40.

The main chamber 18 is selectively extendable along the axis A from the unreleased position to the released position. The main chamber 18 is selectively extendable based on a determination of the size of an occupant seated in the seat 14. When a smaller occupant, e.g., a shorter occupant, is seated in the seat 14, the main chamber 18 is maintained in the unreleased position to control the kinematics of the occupant. When a larger occupant, e.g., a taller occupant, is seated in the seat 14, the main chamber 18 extends to the released position to control the kinematics of the occupant. In the unreleased position, the main chamber 18 is elongated a first distance D1. In the released position, the main chamber 18 is elongated a second distance D2. The second distance D2 is longer than the first distance D1.

The main chamber 18 includes the lower segment 22 and the upper segment 24. The upper segment 24 extends upwardly from the lower segment 22 to an upper end 50 and the lower segment 22 extends downwardly from the upper segment 24 to a lower end 52. The upper segment 24 may include the vehicle-inboard panel 48 and the vehicle-outboard panel 46 spaced from the vehicle-inboard panel 48.

The upper segment 24 is selectively extendable along the axis A. Based on a determination of the size of an occupant seated in the seat 14, the upper segment 24 is selectively extendable. Specifically, the upper segment 24 is extendable along the seatback 26. The upper segment 24 is selectively extendable to the released position when a larger occupant is identified to be seated in seat 14. The upper segment 24 is extendable to move the upper segment 24 to the released position. The main chamber 18 moves to the released position by the upper segment 24 extending along the seatback 26. The upper segment 24 is extendable away from the lower segment 22 along the axis A. As the upper segment 24 moves to the released position, the upper segment 24 moves upwardly along the axis A and away from the lower segment 22.

In situations where the upper segment 24 moves to the released position, the upper end 50 of the upper segment 24 is translatable upwardly from the unreleased position to the released position. The upper end 50 of the upper segment 24 is translatable relative to the seatback 26. In other words, the seatback 26 remains stationary as the upper end 50 of the upper segment 24 moves to the released position. The upper end 50 translates along the axis A as the upper segment 24 moves from the unreleased position to the released position. The upper end 50 moves upwardly and away from the lower end 52 as the upper segment 24 moves to the released position. The upper end 50 translates a third distance D3 along the axis A that is the difference between the first distance D1 and the second distance D2. The upper end 50 is at the first distance D1 from the lower end 52 when the upper segment 24 is in the released position.

The upper segment 24 may include a releasable portion 54 elongated along the axis A. The releasable portion 54 is releasable to move the upper segment 24 from the unreleased position to the released position. A stitch 56 may extend through the releasable portion 54 to limit movement of excess material from the overlapping of the upper segment 24 in the unreleased position if a smaller occupant is in the seat 14. Any suitable number of stitches 56 may extend through the releasable portion 54 to limit movement of excess material of the upper segment 24 in the unreleased position. For example, in the examples shown in the Figures, four stitches 56 extend through the releasable portion 54. The stitches 56 are frangible relative to the airbag 16. As the upper segment 24 moves to the released portion, the stitches 56 release, i.e., break, to allow the upper segment 24 to move to the released position. The vehicle-inboard panel 48 and the vehicle-outboard panel 46 may include the releasable portion 54.

Figure 4A:
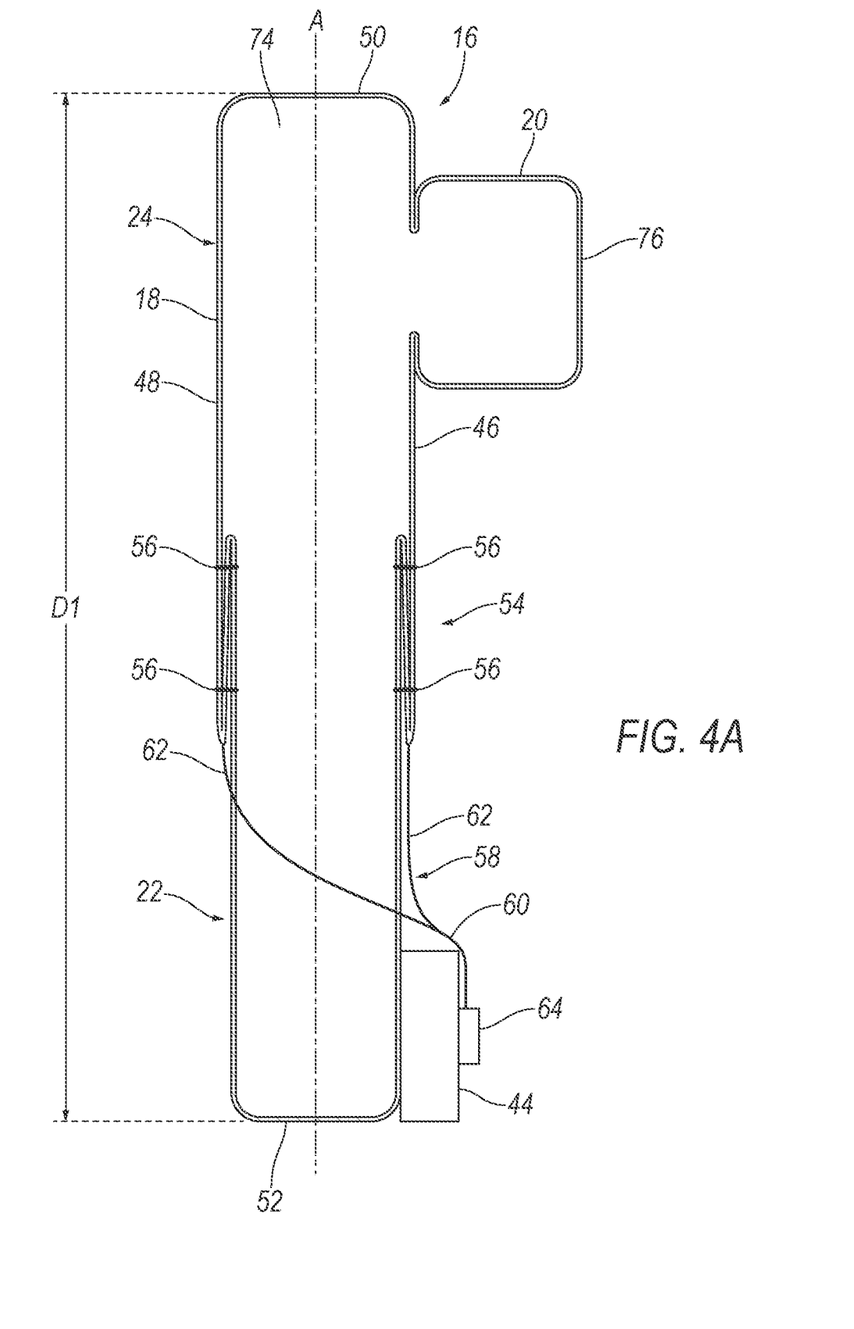
FIG. 4A is a cross-sectional view of the airbag in the unreleased position with a releasable tether external to the main chamber.
Figure 4B:
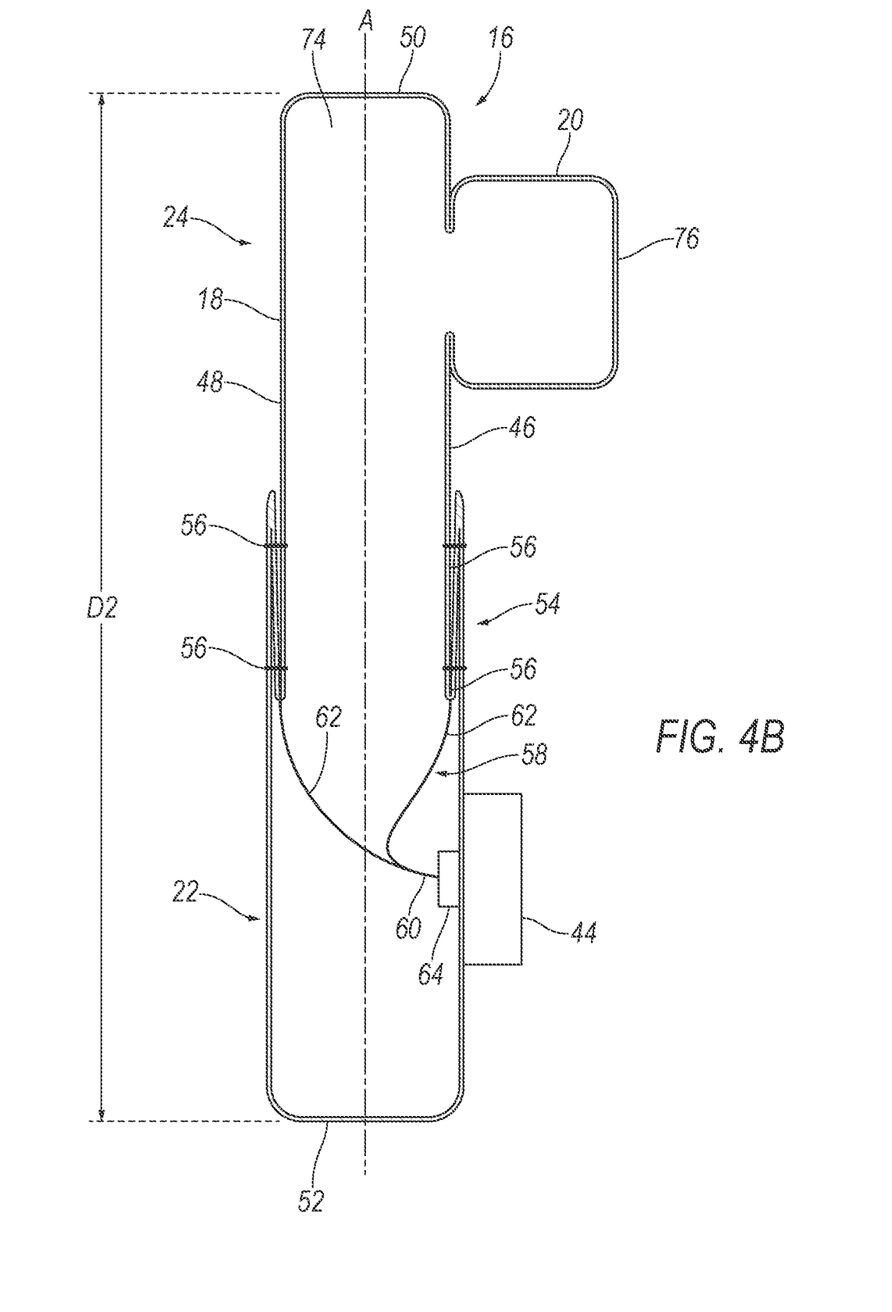
FIG. 4B is a cross-sectional view of the airbag in the unreleased position with the releasable tether interior to the main chamber.

At the releasable portion 54, the upper segment 24 overlaps itself. In other words, the upper segment 24 may be folded over itself to have the releasable portion 54. As the upper segment 24 moves to the released position, the upper segment 24 unfolds. As the releasable portion 54 unfolds, the upper segment 24 extends along the axis A to the released position. In other words, the releasable portion 54 of the upper segment 24 unfolds to allow the upper segment 24 to move to the released position. In some examples, such as shown in FIG. 4A, the upper segment 24 overlapping itself may be exterior to the airbag 16. In other examples, such as shown in FIG. 4B, the upper segment 24 overlapping itself may be interior to the airbag 16.

The inflator 44 is in fluid communication with the airbag 16. Specifically, the inflator 44 is in fluid communication with the main chamber 18 and the extension 20. The inflator 44 expands the airbag 16 with inflation medium, such as a gas, to move the airbag 16 from the uninflated position to the inflated position. Specifically, the airbag 16 includes an inflation chamber 74 extending through the main chamber 18 and the extension 20 and the inflator 44 expands the inflation chamber 74. The inflator 44 may be supported by any suitable component. For example, the inflator 44 may be supported by the housing of the airbag assembly 42. The inflator 44 may be, for example, a pyrotechnic inflator that ignites a chemical reaction to generate the inflation medium, a stored gas inflator that releases e.g., by a pyrotechnic valve stored gas as the inflation medium, or a hybrid. The inflator 44 may be, for example, at least partially in the inflation chamber 74 of the airbag 16 to deliver inflation medium directly to the inflation chamber 74 or may be connected to the inflation chamber 74 through fill tubes, diffusers, etc.

With reference to FIGS. 4A-6B, the assembly 10 includes a releasable tether 58 between the lower segment 22 and the upper segment 24. Specifically, the releasable tether 58 extends from the lower segment 22 to the upper segment 24. The releasable tether 58 may be connected to a portion of the upper segment 24 to maintain the upper segment 24 in the unreleased position.

The releasable tether 58 is selectively releasably connected to the main chamber 18. Specifically, the releasable tether 58 is selectively releasably connected to the releasable portion 54. In other words, the releasable tether 58 is releasable to allow the releasable portion 54 of the upper segment 24 to move to the released position based on a determination of the size of an occupant of the seat 14. The main chamber 18 is in the unreleased position when the releasable tether 58 is in an unreleased position and the main chamber 18 is in the released position when the releasable tether 58 is in a released position. In other words, the upper segment 24 is maintained by the releasable tether 58 in the unreleased position and the upper segment 24 is releasable by the releasable tether 58 to the released position along the axis A. The releasable tether 58 is maintained, along with the stiches, to maintain the upper segment 24 in the unreleased position. The releasable tether 58 is released to allow the stitches 56 to release and the upper segment 24 to move to the released position.

Figure 5A:
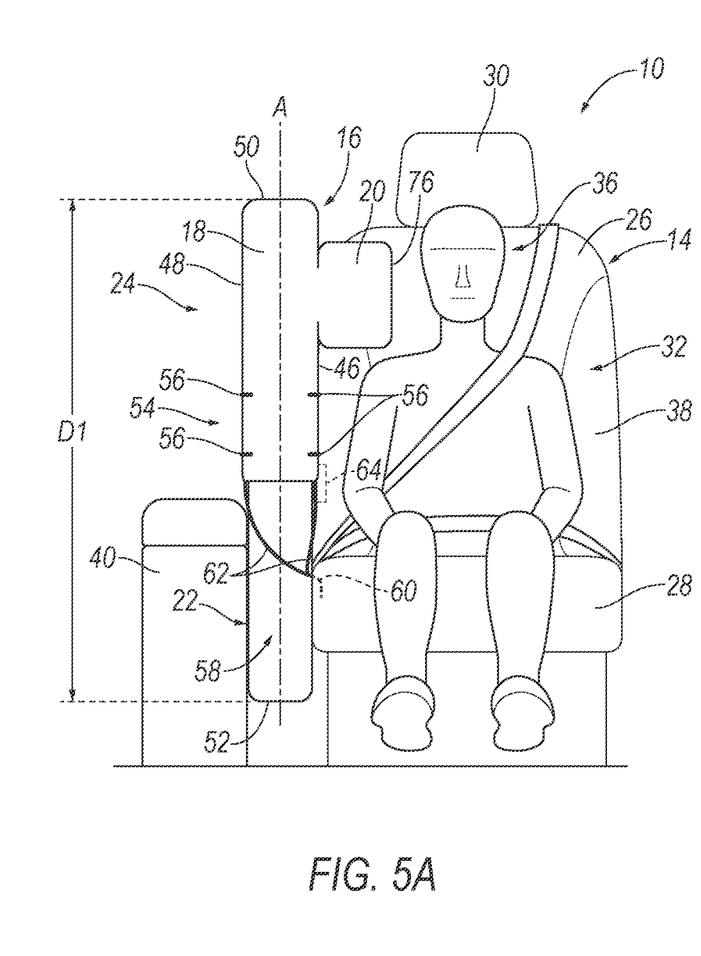
FIG. 5A is a frontal view of the seat adjacent the airbag in the unreleased position and the releasable tether exterior to the main chamber.
Figure 5B:
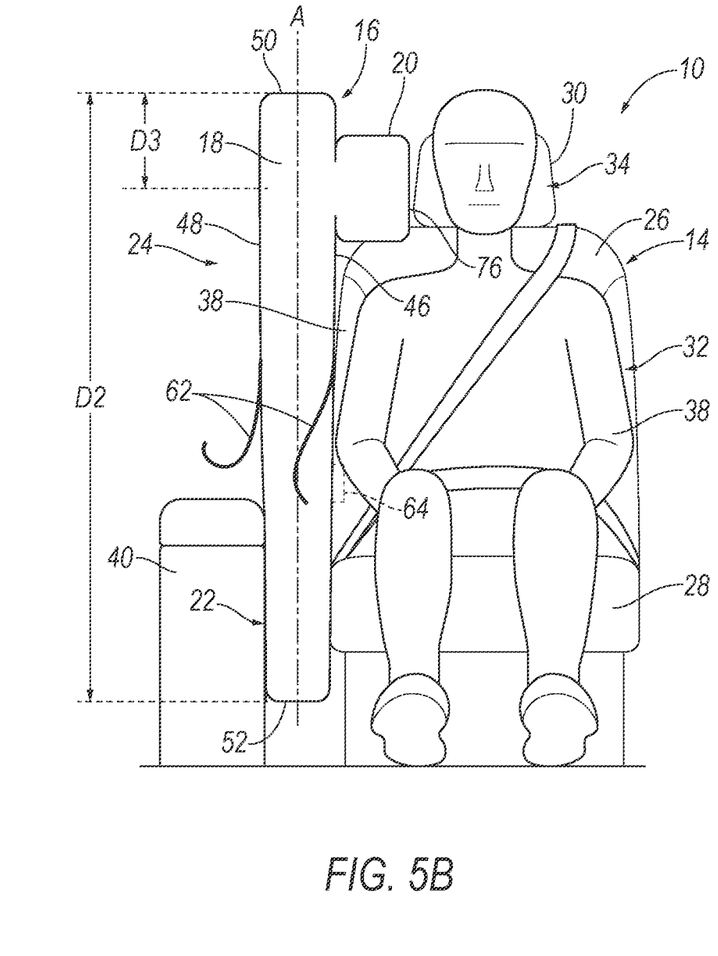
FIG. 5B is a frontal view of the seat adjacent the airbag in the released position and the releasable tether released.
Figure 6A:
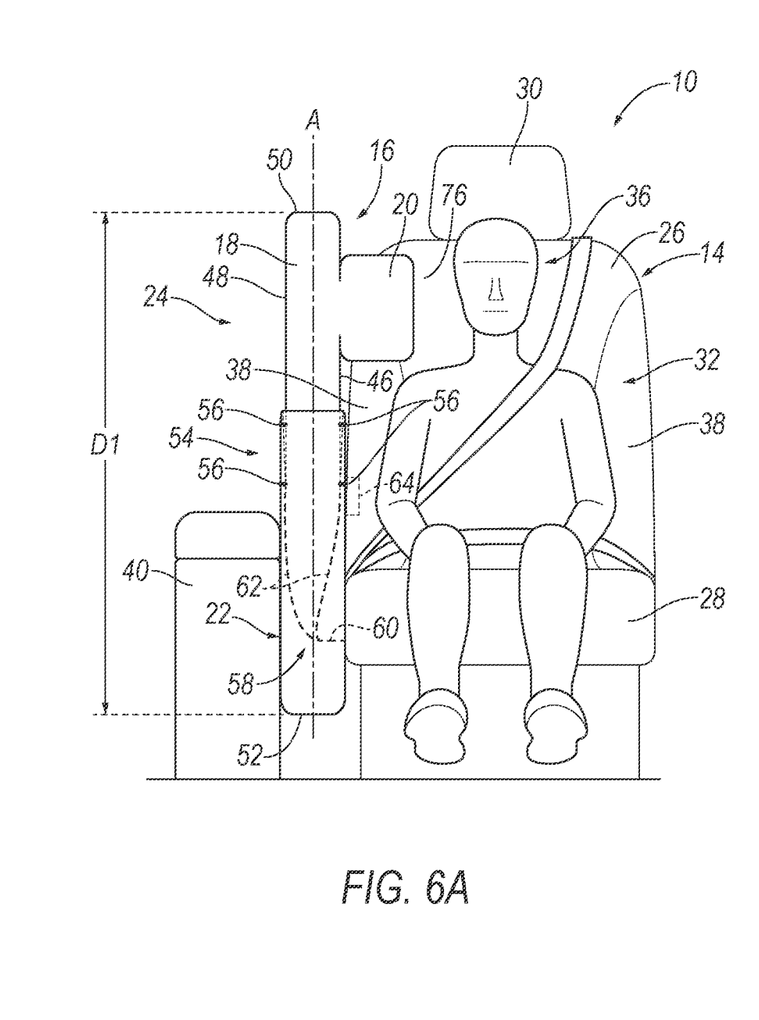
FIG. 6A is a frontal view of the seat adjacent the airbag in the unreleased position and the releasable tether interior to the main chamber.
Figure 6B:
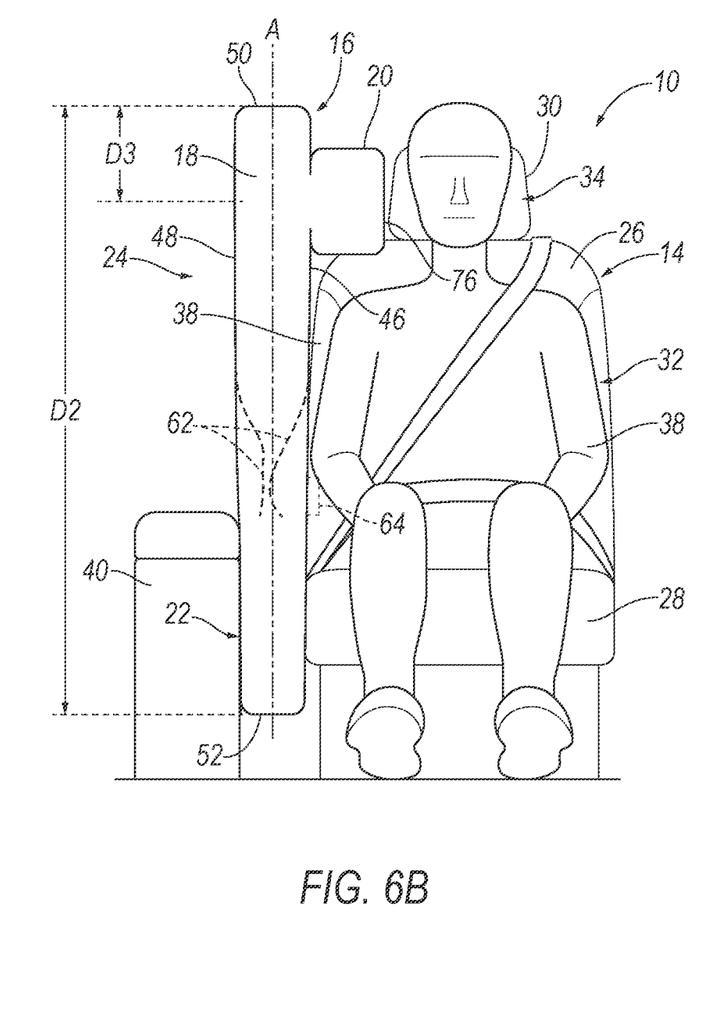
FIG. 6B is a frontal view of the seat adjacent the airbag in the released position and the releasable tether released.

In the example shown in FIGS. 4A and 5A-5B, the releasable tether 58 extends exterior to the main chamber 18. In such an example, the releasable tether 58 may extend exterior to the inflation chamber 74 of the lower segment 22 to the upper segment 24 and the upper segment 24 may be overlapping of itself on the exterior of the upper segment 24. In another example, as shown in the example shown in FIGS. 4B and 6A-6B, the releasable tether 58 extends interior to the main chamber 18. In such an example, the releasable tether 58 may extend from the lower segment 22 to the upper segment 24 interior to the inflation chamber 74 of the airbag 16 and the upper segment 24 may be overlapping of itself on the interior of the upper segment 24.

As shown in FIGS. 4A and 4B, the releasable tether 58 is continuous between the upper segment 24 and the lower segment 22. The releasable tether 58 may include a main section 60 at the lower segment 22 and two secondary sections 62 extending from the main section 60 to the upper segment 24.

The assembly 10 includes a tether release 64 coupled to the releasable tether 58. Specifically, the airbag assembly 42 may include the tether release 64. The releasable tether 58 is selectively releasable by the tether release 64. In other words, the tether release 64 is selectively activatable to selectively release the releasable tether 58. The tether release 64 may activate to release the releasable tether 58 when the upper segment 24 is to move to the released position and the tether release 64 does not activate when the releasable tether 58 is to maintain the upper segment 24 in the unreleased position.

The tether release 64 is supported by the seatback 26 of the seat 14. Specifically, the tether release 64 may be supported by seat frame of the seatback 26. In some examples, the tether release 64 may be in the housing of the airbag assembly 42. The tether release 64 may be supported by any suitable component of the vehicle 12 or the seat 14.

As an example, the tether release 64 may be a cutter that cuts the releasable tether 58. As another example, the tether release 64 may be a clamp that releases the releasable tether 58. As yet another example, the tether release 64 may include a releasable post (not shown) that is coupled to the releasable tether 58. In such an example, the releasable post is released to allow the releasable tether 58 to release. The tether release 64 may be any suitable type of tether release 64 to release the releasable tether 58. The tether release 64 may be pyrotechnically actuated, i.e., the tether release 64 may include a pyrotechnic device that cuts the releasable tether 58, releases the end of the releasable tether 58, releases the releasable post to release the releasable tether 58, etc.

With reference to FIGS. 2-6B, the extension 20 is supported by the main chamber 18. Specifically, the extension 20 is supported by the upper segment 24 of the main chamber 18. The extension 20 may control the kinematics of the occupant, specifically, the occupant's head, when the airbag 16 is in the inflated position. The extension 20 is supported by the vehicle-outboard panel 46 of the upper segment 24. In other words, the extension 20 is seat-inboard of the main chamber 18 in the inflated position. The extension 20 is between the main chamber 18 and the occupant seating area 32 in the inflated position. The extension 20 is between the main chamber 18 and the occupant head areas 34, 36 in the inflated position. In the inflated position, the extension 20 is elongated from the vehicle-outboard panel 46 to a distal end 76 spaced from the vehicle-outboard panel 46. The distal end 76 is adjacent the occupant seating area 32 and the occupant head areas 34, 36 when the airbag 16 is in the inflated position. As the extension 20 inflates, the distal end 76 moves away from the main chamber 18 and toward the occupant head areas 34, 36. In other words, the extension 20 is inflatable adjacent the head of an occupant seated in the seat 14.

Depending on the size of the occupant in the seat 14, the extension 20 is translatable along the axis A as main chamber 18 moves to the released position. Specifically, the extension 20 is translatable relative to the seatback 26. In other words, the extension 20 is translatable with the main chamber 18, i.e., the upper segment 24, as the main chamber 18 moves from the unreleased position to the released position. Specifically, the extension 20 moves with the upper segment 24 as the main chamber 18 moves to the released position. The translation of the extension 20 allows the extension 20 to control the kinematics of different size occupants seated in the seat 14 at different times. The extension 20 is adjacent the first occupant head area 34 when the upper segment 24 is in the released position and the extension 20 is adjacent the second occupant head area 36 when the upper segment 24 is in the unreleased position.

The extension 20 is inflatable transverse to the axis A. For example, the extension 20 may be inflatable perpendicular to the axis A. The extension 20 is inflatable away from the main chamber 18 toward the occupant seating area 32 and the occupant head areas 34, 36. Specifically, the extension 20 is inflatable away from the vehicle-outboard panel 46 of the main chamber 18 toward the occupant seating area 32 and the occupant head areas 34, 36. The extension 20 is inflatable when the upper segment 24 is both in the unreleased position and the released position.

The airbag 16 may be fabric, e.g., a woven polymer. As an example, the airbag 16 may be woven nylon yarn, for example, nylon 6, 6. Other examples of woven polymers include polyether ether ketone PEEK, polyetherketoneketone PEKK, polyester, etc. The woven polymer may include a coating, such as silicone, neoprene, urethane, etc. For example, the coating may be polyorgano siloxane.

Figure 7:
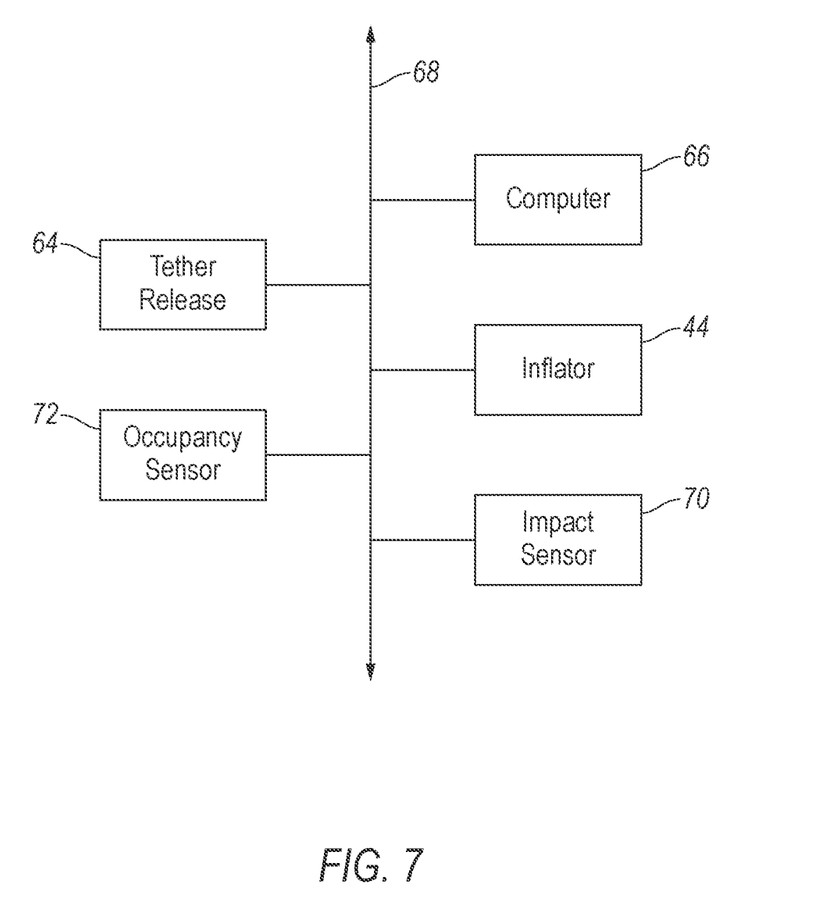
FIG. 7 is a block diagram of a vehicle communication network for a vehicle.

With reference to FIG. 7, the computer 66 includes a processor and a memory. The memory includes one or more forms of computer 66 readable media, and stores instructions executable by the computer 66 for performing various operations, including as disclosed herein. For example, the computer 66 may be a restraints control module (RCM). The computer 66 can be a generic computer with a processor and memory as described above and/or may include an electronic control unit ECU or controller for a specific function or set of functions, and/or a dedicated electronic circuit including an ASIC (application specific integrated circuit) that is manufactured for a particular operation, e.g., an ASIC for processing sensor data and/or communicating the sensor data. In another example, the computer 66 may include an FPGA (Field-Programmable Gate Array) which is an integrated circuit manufactured to be configurable by a user. Typically, a hardware description language such as VHDL (Very High-Speed Integrated Circuit Hardware Description Language) is used in electronic design automation to describe digital and mixed-signal systems such as FPGA and ASIC. For example, an ASIC is manufactured based on VHDL programming provided pre-manufacturing, whereas logical components inside an FPGA may be configured based on VHDL programming, e.g. stored in a memory electrically connected to the FPGA circuit. In some examples, a combination of processor(s), ASIC(s), and/or FPGA circuits may be included in the computer 66.

The memory can be of any type, e.g., hard disk drives, solid state drives, servers, or any volatile or non-volatile media. The memory can store the collected data sent from the sensors. The memory can be a separate device from the computer 66, and the computer 66 can retrieve information stored by the memory via a network in the vehicle 12, e.g., over a CAN bus, a wireless network, etc. Alternatively or additionally, the memory can be part of the computer 66, e.g., as a memory of the computer 66.

With continued reference to FIG. 7, the computer 66 is generally arranged for communications on a vehicle communication network 68 that can include a bus in the vehicle 12 such as a controller area network CAN or the like, and/or other wired and/or wireless mechanisms. Alternatively or additionally, in cases where the computer 66 includes a plurality of devices, the vehicle communication network 68 may be used for communications between devices represented as the computer 66 in this disclosure. Further, as mentioned below, various controllers and/or sensors may provide data to the computer 66 via the vehicle communication network 68.

The vehicle 12 may include at least one impact sensor 70 for sensing certain impacts of the vehicle 12, and a computer 66 in communication with the impact sensor 70 and the inflators 44. The computer 66 may activate the inflators 44, e.g., provide an impulse to a pyrotechnic charge of the inflators 44 when the impact sensor 70 senses certain impact of the vehicle 12. Alternatively or additionally to sensing certain impacts, the impact sensor 70 may be configured to sense certain impacts prior to the certain impact, i.e., pre-impact sensing. The impact sensor 70 may be in communication with the computer 66. The impact sensor 70 is configured to detect certain impacts to the vehicle 12. The impact sensor 70 may be of any suitable type, for example, post contact sensors such as accelerometers, pressure sensors, and contact switches; and pre-impact sensors such as radar, LIDAR, and vision sensing systems. The vision sensing systems may include one or more cameras, CCD image sensors, CMOS image sensors, etc. The impact sensor 70 may be located at numerous points in or on the vehicle 12.

The assembly 10 may include occupancy sensors 72 to identify whether an occupant is seated in one or more of the seats 14. The computer 66 may be in communication with the occupancy sensors 72. The occupancy sensors 72 may be coupled to the seats 14 to identify when an occupant is seated in the seats 14. As an example, the occupancy sensors 72 may indicate to the computer 66 that the seat 14 is occupied. For example, the occupancy sensor 72 may communicate to the computer 66, e.g., by sending a signal to the computer 66, that the seat 14 is occupied and in the absence of such communication the computer 66 may classify the seat 14 as unoccupied. As another example, the occupancy sensor 72 may be configured to communicate to the computer 66 that the seat 14 is occupied when the seat 14 is occupied and to communicate to the computer 66 that the seat 14 is unoccupied when the seat 14 is unoccupied, e.g., by sending a signal to the computer 66 when the seat 14 is occupied and unoccupied indicating occupancy or lack thereof.

The occupancy sensor 72 may determine the size of the occupant seated in the seat 14 when the seat 14 is determined to be occupied. The size of the occupant may be determined relative to the location of the occupant's head to the occupant head areas 34, 36. The occupancy sensor 72 may determine, for example, the height or weight of the occupant in the seat 14. As an example, the occupancy sensors 72 may determine a larger occupant, i.e., taller occupant, is seated in the seat 14 if the head of the occupant is determined to be in the first occupant head area 34. As another example, the occupancy sensors 72 may determine a smaller occupant, i.e., a shorter occupant, is seated in the seat 14 if the head of the occupant is determined to be in the second occupant head area 36.

The occupancy sensor 72 may be, for example, a weight sensor, image detection, a buckled seatbelt, etc. The vehicle 12 may include any suitable number of occupancy sensors 72. For example, the vehicle 12 may include a number of occupancy sensors 72 equal to the number of seats 14 in the vehicle 12. Specifically, in the examples shown in the Figures, all seats 14 in the vehicle 12 may each include an occupancy sensor 72.

Figure 8:
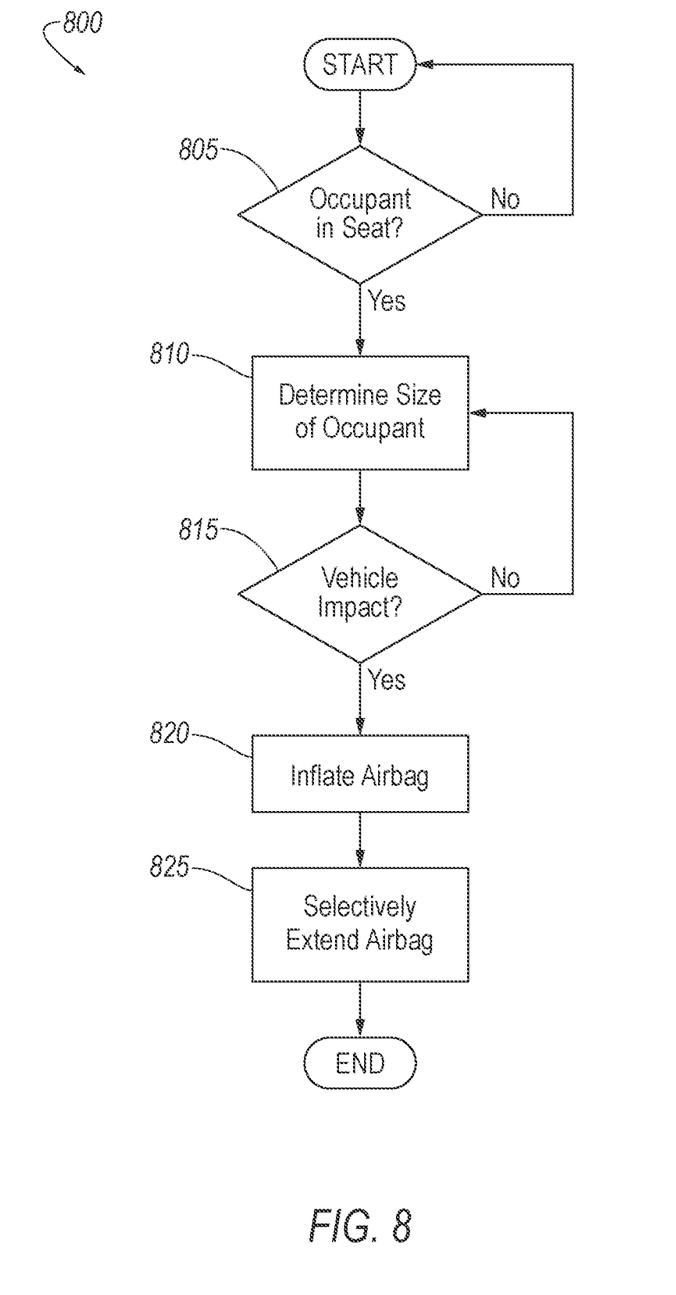
FIG. 8 is a flow chart of a method executable by a computer of the vehicle.

With reference to FIG. 8, the computer 66 stores instructions to control components of the vehicle 12 according to method 800. Specifically, as shown in FIG. 8, the method 800 includes to move the upper segment 24 of the main chamber 18 to the released position based on a determination of the size of the occupant of the seat 14. Any use of "in response to," "based on," and "upon determining" herein indicates a causal relationship, not merely a temporal relationship.

With reference to decision block 805, the method 800 includes identifying whether an occupant is seated in the seat 14 of the vehicle 12. The occupancy sensor 72 may notify the computer 66 that an occupant is seated in the seat 14, such as by sending a signal or lacking sending a signal. The occupancy sensor 72 If no occupant is determined to be seated in the seat 14, the method 800 returns to its start. If an occupant is determined to be seated in the seat 14, the method 800 moves to block 810.

With reference to block 810, based on determining the seat 14 is occupied, the method 800 includes determining the size of the occupant of the seat 14. The occupancy sensors 72 may send a signal notifying the computer 66 of the size of the occupant in the seat 14. The size of the occupant may be stored by the computer 66 to be used to determine whether to move the upper segment 24 of the main chamber 18 to the released position. Moving the upper segment 24 of the main chamber 18 to the released position includes releasing the releasable portion 54 of the upper segment 24 based on the size of the occupant.

With reference to decision block 815, the method 800 includes identification of certain vehicle impacts, e.g., certain far-side impacts. The impact sensors 70 may identify whether certain vehicle impacts have occurred. If a certain vehicle impact is identified, the method 800 moves to block 820. If no vehicle impact is identified, the method 800 returns to block 810.

With reference to block 820, based at least on identification of the certain vehicle impact, the method 800 includes inflating the airbag 16 to the inflated position. The computer 66 may send a signal to the inflator 44 to move the airbag 16 to the inflated position.

With reference to block 825, based on the identification of the size of the occupant that was stored by the computer 66 and the identification of the certain vehicle impact, the method 800 includes selectively extending the main chamber 18 to the released position. Block 825 includes selectively extending the main chamber 18 to released position by selectively activating the tether release 64 if the size of the occupant is identified to be a larger occupant. If the occupant is identified to be a smaller occupant, the tether release 64 is not activated and the releasable tether 58 is maintained.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

What is claimed is:

1. An assembly comprising:
a vehicle seat;
an airbag supported by the vehicle seat and inflatable to an inflated position, the airbag having a main chamber elongated along an axis and an extension supported by the main chamber and extending from the main chamber transverse to the axis in the inflated position;
the main chamber having a lower segment and an upper segment selectively extendable away from the lower segment along the axis from an unreleased position to a released position; and
the extension being supported by the upper segment of the main chamber and being translatable along the axis with the main chamber from the unreleased position to the released position.

2. The assembly of claim 1, wherein the upper segment includes a releasable portion elongated along the axis, the releasable portion being releasable from the unreleased position to the released position.

3. The assembly of claim 2, further comprising a stitch extending through the releasable portion, the stitch being frangible relative to the airbag.

4. The assembly of claim 2, further comprising a releasable tether selectively releasably connected to the releasable portion, the main chamber being in the unreleased position when the releasable tether in an unreleased position and the main chamber being in the released position when the releasable tether is in a released position.

5. The assembly of claim 2, wherein the upper segment includes a vehicle-inboard panel and a vehicle-outboard panel, the vehicle-inboard panel and the vehicle-outboard panel including the releasable portion.

6. The assembly of claim 5, wherein the extension is supported by the vehicle-outboard panel.

7. The assembly of claim 2, wherein the upper segment overlaps itself at the releasable portion in the unreleased position.

8. The assembly of claim 2, further comprising a computer including a processor and a memory storing instructions executable by the processor to:
identify a size of an occupant seated in the vehicle seat; and
release the releasable portion based on the identification of the size of the occupant.

9. The assembly of claim 1, further comprising a releasable tether selectively releasably connected to the main chamber, the main chamber being in the unreleased position when the releasable tether in an unreleased position and the main chamber being in the released position when the releasable tether is in a released position.

10. The assembly of claim 9, further comprising a tether release coupled to the releasable tether.

11. The assembly of claim 10, further comprising a computer including a processor and a memory storing instructions executable by the processor to:
identify a size of an occupant seated in the vehicle seat; and
activate the tether release based on the identification of the size of the occupant.

12. The assembly of claim 1, further comprising a computer including a processor and a memory storing instructions executable by the processor to:
identify a size of an occupant seated in the vehicle seat; and
release the upper segment based on identification of the size of the occupant.

13. The assembly of claim 1, wherein the main chamber is elongated a first distance in the unreleased position and a second distance in the released position, the second distance being longer than the first distance.

14. The assembly of claim 1, wherein the airbag is vehicle-inboard of the vehicle seat in the inflated position.

15. The assembly of claim 1, further comprising a console adjacent the vehicle seat, the airbag being inflatable between the console and the vehicle seat.

16. The assembly of claim 1, wherein the vehicle seat defines an occupant seating area, the extension being between the main chamber and the occupant seating area.

17. The assembly of claim 16, wherein the airbag is vehicle-inboard of the occupant seating area.

18. The assembly of claim 1, wherein the vehicle seat includes a seatback elongated along the axis, the airbag being supported by the seatback.

19. The assembly of claim 18, wherein the upper segment is extendable along the seatback.

20. The assembly of claim 18, wherein the extension is translatable relative to the seatback.

* * * * *